No. 759,697. PATENTED MAY 10, 1904.
A. GRAHAM.
TELEPHONIC APPARATUS.
APPLICATION FILED FEB. 4, 1903.
NO MODEL. 9 SHEETS—SHEET 1.

Witnesses.
W Cross
P Phillips

Inventor:
Alfred Graham

No. 759,697. PATENTED MAY 10, 1904.
A. GRAHAM.
TELEPHONIC APPARATUS.
APPLICATION FILED FEB. 4, 1903.
NO MODEL. 9 SHEETS—SHEET 3.

Witnesses:
W Cross
P Phillips

Inventor:
Alfred Graham

No. 759,697. PATENTED MAY 10, 1904.
A. GRAHAM.
TELEPHONIC APPARATUS.
APPLICATION FILED FEB. 4, 1903.
NO MODEL. 9 SHEETS—SHEET 4.

No. 759,697. PATENTED MAY 10, 1904.
A. GRAHAM.
TELEPHONIC APPARATUS.
APPLICATION FILED FEB. 4, 1903.

NO MODEL. 9 SHEETS—SHEET 7.

Witnesses.
W. Cross
F. Phillips

Inventor.
Alfred Graham

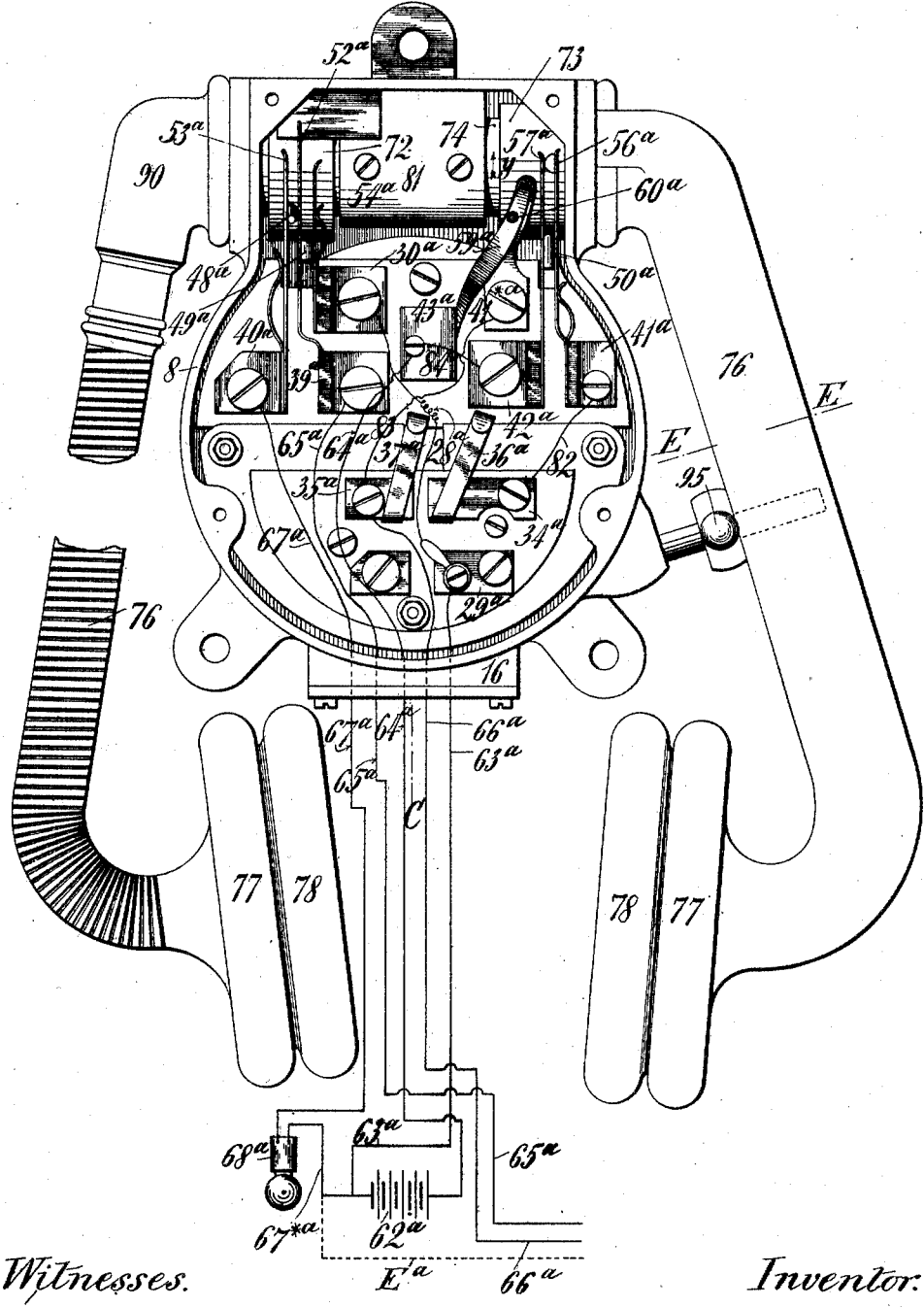

No. 759,697. PATENTED MAY 10, 1904.
A. GRAHAM.
TELEPHONIC APPARATUS.
APPLICATION FILED FEB. 4, 1903.
NO MODEL. 9 SHEETS—SHEET 9.

Witnesses
W. Cross
P. Phillips

Inventor
Alfred Graham

No. 759,697. Patented May 10, 1904.

UNITED STATES PATENT OFFICE.

ALFRED GRAHAM, OF LONDON, ENGLAND.

TELEPHONIC APPARATUS.

SPECIFICATION forming part of Letters Patent No. 759,697, dated May 10, 1904.

Application filed February 4, 1903. Serial No. 141,924. (No model.)

*To all whom it may concern:*

Be it known that I, ALFRED GRAHAM, a subject of the King of Great Britain and Ireland, residing at Denmark Hill, London, England, have invented Improvements in Telephonic Apparatus, of which the following is a specification.

This invention has reference to various improvements in telephonic apparatus; and it has for its object to construct such apparatus in a simpler, more compact, and waterproof manner than heretofore usual.

The invention consists in various novel features of construction and in combinations and arrangements of parts, all as hereinafter more fully described, and pointed out in the claims.

Figure 1:
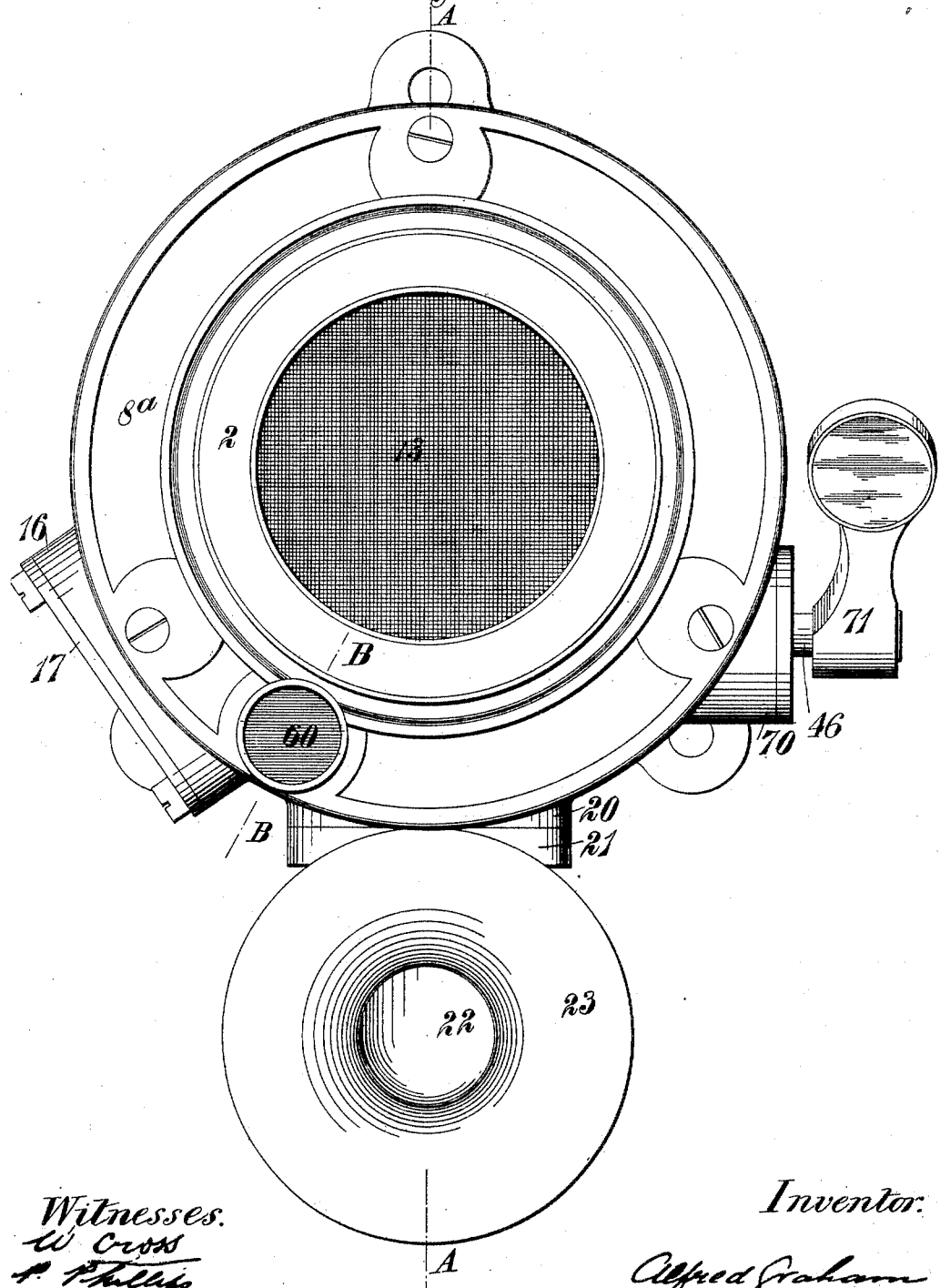
Figure 2:
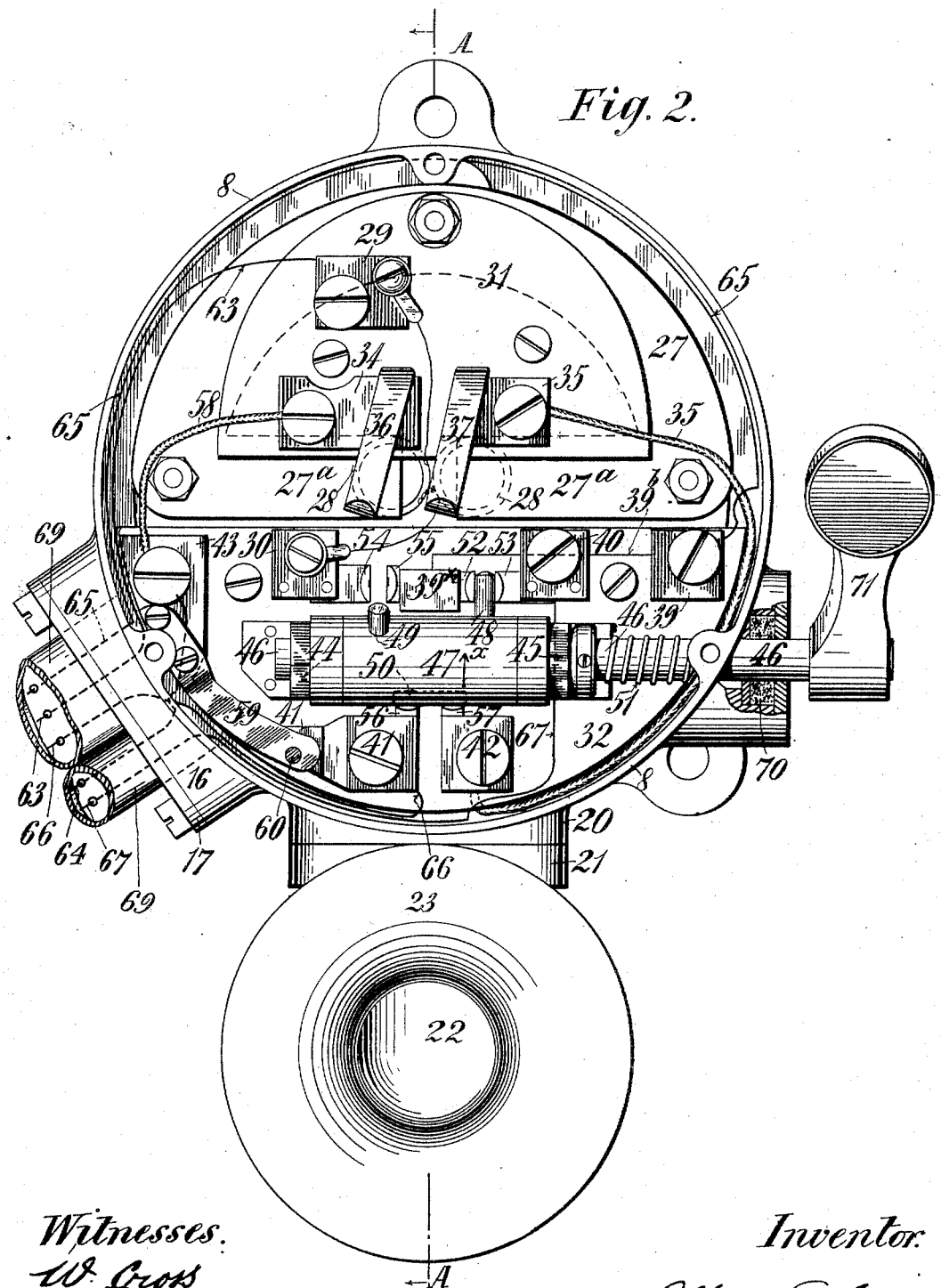
Figure 3:
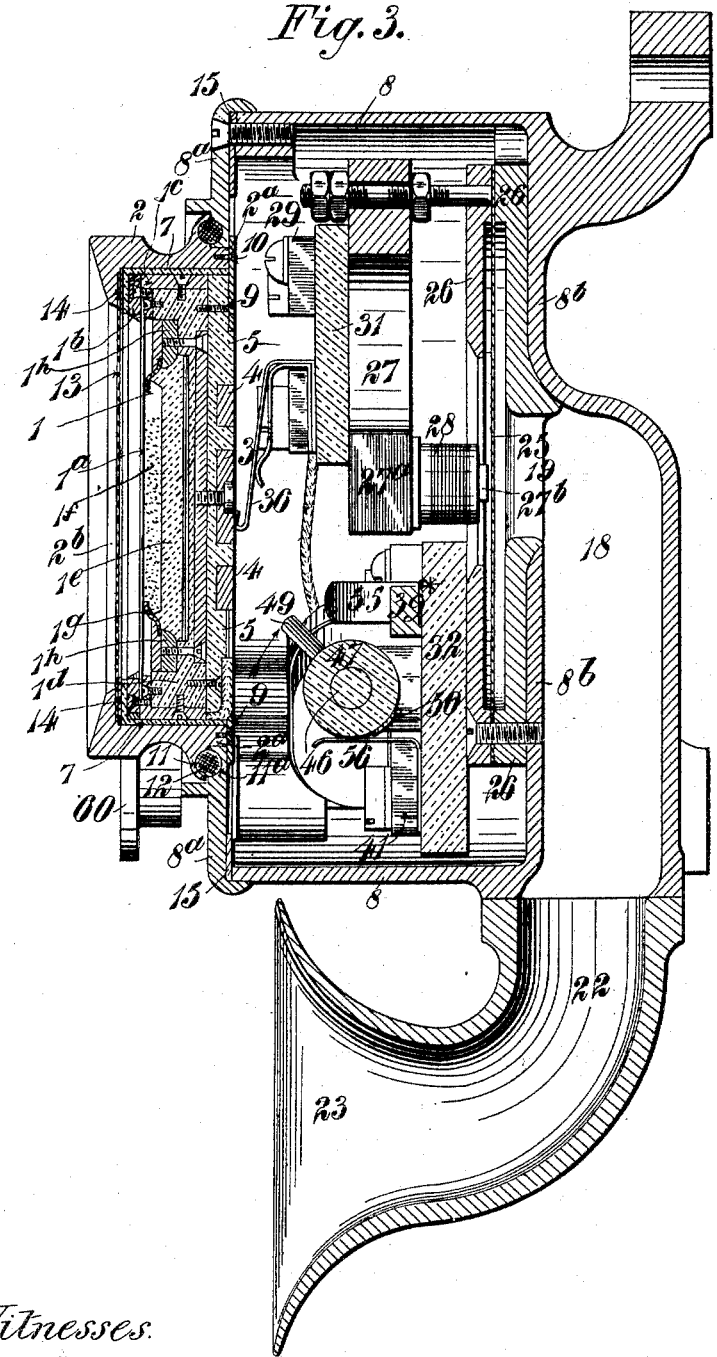
Figure 4:
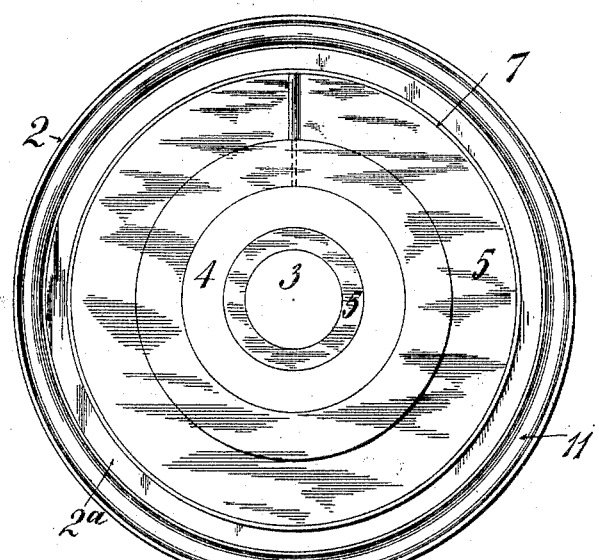
Figure 5:
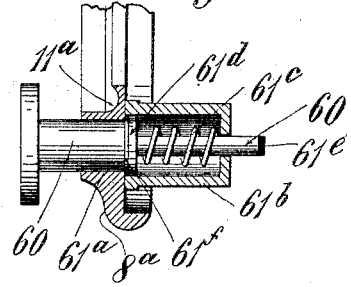
Figure 6:
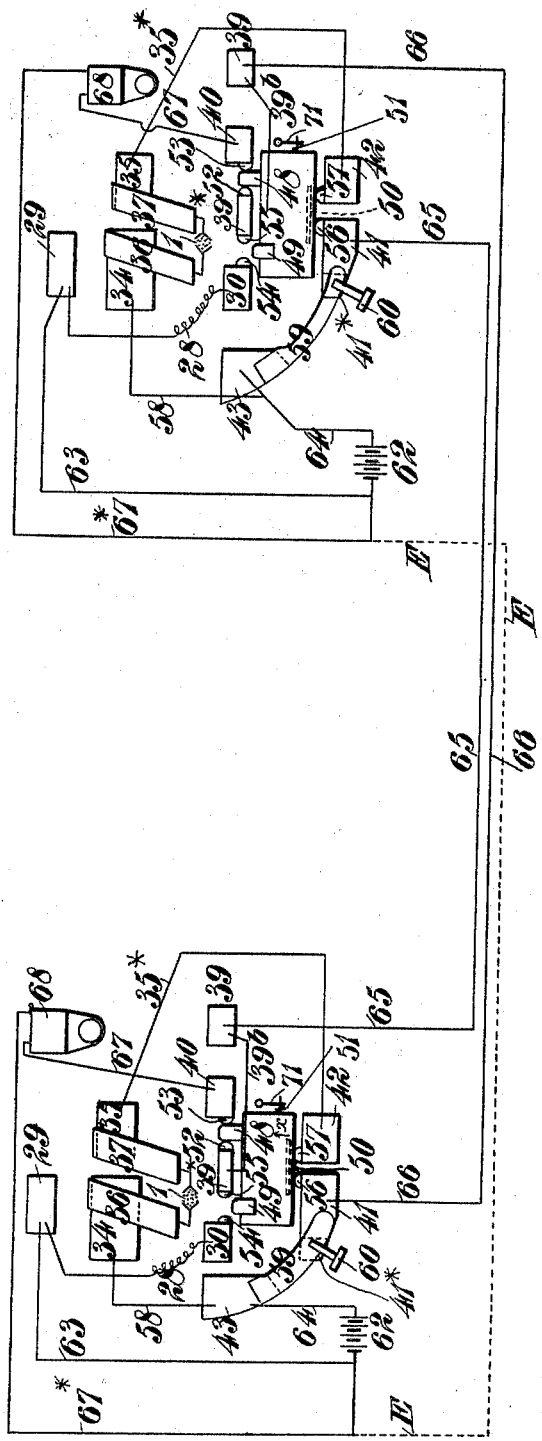
Figure 7:
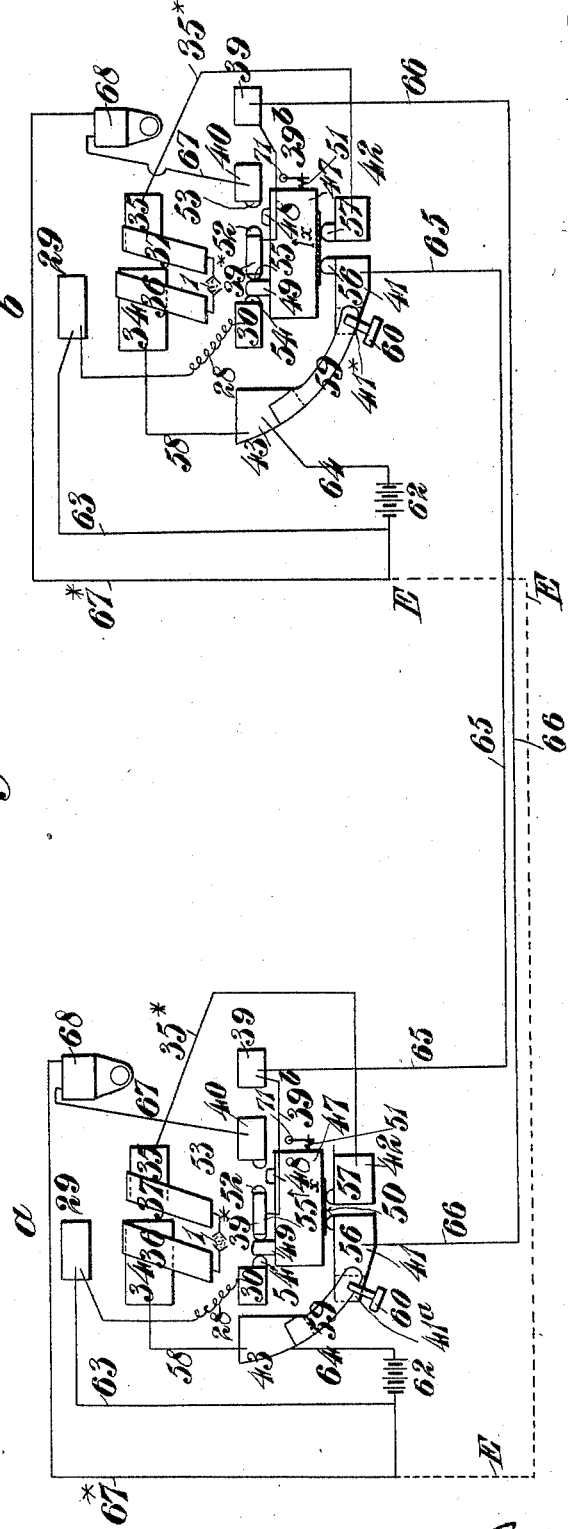
Figure 8:
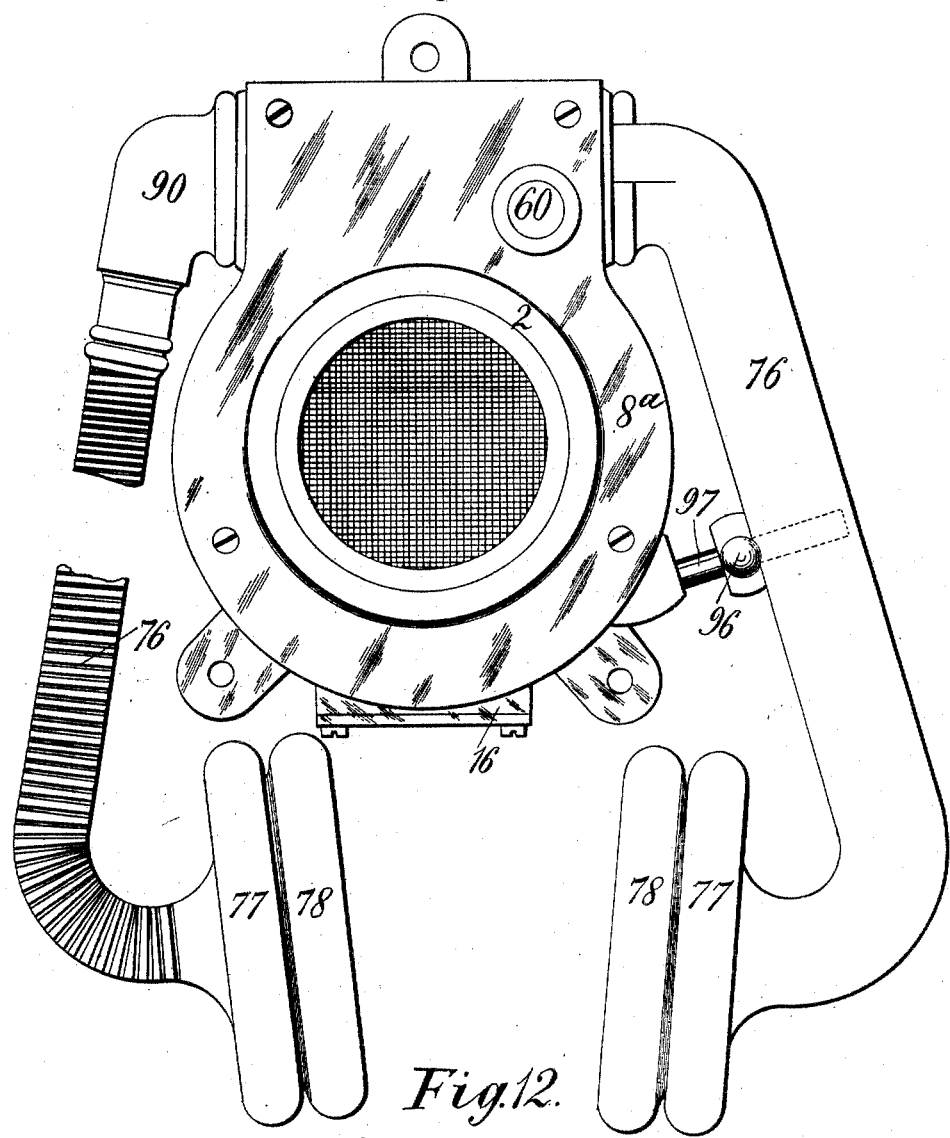
Figure 12:
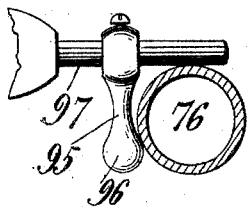
Figure 10:
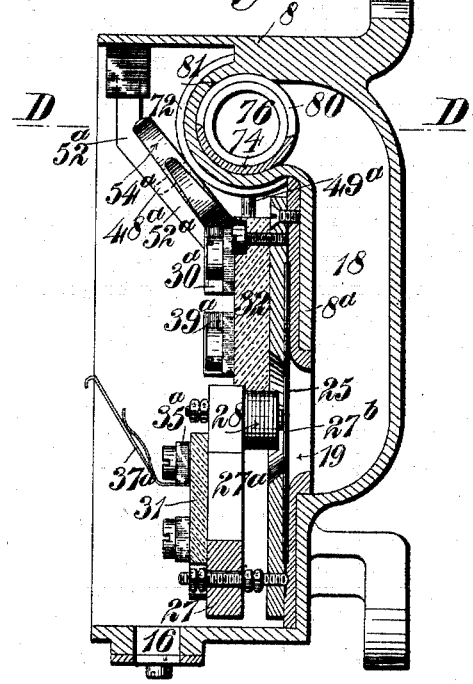
Figure 11:
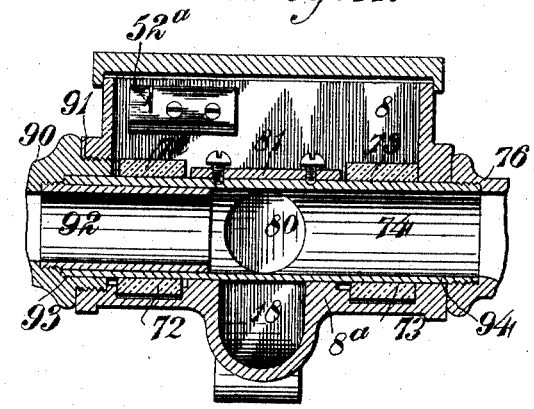

In the accompanying illustrative drawings, Figure 1 is a front elevation, Fig. 2 a front elevation with the cover removed and part of the casing in section, and Fig. 3 a cross-section on the line A A of Figs. 1 and 2, showing one construction of telephonic apparatus according to this invention. Fig. 4 is a rear view of the cover and adjacent parts of such apparatus. Fig. 5 is a part section on the line B B of Fig. 1. Figs. 6 and 7 are diagrams. Fig. 8 is a front view, Fig. 9 a front view with the cover removed, Fig. 10 a section on the line C C of Fig. 9, and Fig. 11 is a section on the line D D of Fig. 10 viewed from below, showing a modified construction. Fig. 12 is a cross-section on the line E E of Fig. 9.

In the construction shown in Figs. 1 to 7, inclusive, the waterproof telephonic transmitter (marked collectively 1) is of the kind described in the specification of former Letters Patent granted to me, No. 655,620, and comprises a carbon disk or diaphragm $1^a$, coated on its outer side with metal foil and clamped between two metal rings $1^b$ $1^c$, that are secured together and to the metal foil, and a disk-like block $1^d$ of insulating material—for example, vulcanized fiber—in a water-tight manner, a carbon cup $1^e$, arranged between the carbon diaphragm and block and charged with carbon powder $1^f$, a ring $1^g$, of soft material, such as felt, to keep the carbon powder in position, and a ring $1^h$ for holding the carbon cup in place, all as described in my said former specification. According to the present invention the said transmitter is fixed within an annular metal rotary holder 2, its terminals being formed by two concentrically-arranged metal contacts 3 and 4, that are separated from each other and are fixed to a block 5, of insulating material, fixed to the back $1^d$ of the transmitter-case, one of the contacts—namely, the center one, 3—being, preferably, of disk shape and the other—viz., 4—of annular shape. The transmitter 1 is preferably separated from the holder 2 by a ring 7, of good insulating material, such as india-rubber. The holder 2 is formed with an annular rearward extension $2^a$, that extends through the cover $8^a$ of the casing 8, to which it is connected in a rotary manner by a ring 9, that is fixed to the said extension by screws 10 and bears against the inner side of the said cover. A water-tight joint is formed between the holder 2 and cover $8^a$ by forming adjacent portions of these parts with oppositely-arranged annular grooves 11 $11^a$, respectively, of semicircular section, and fitting between them a packing-ring 12, of suitable material, such as lamp-wick of circular section saturated with tallow. The opening $2^b$ in the front of the holder 2 opposite the transmitter-diaphragm $1^a$ is provided with a sheet 13, of perforated material, to protect such diaphragm, the said opening being larger than the exposed portion of the diaphragm and so formed and arranged that any rain or moisture that may enter the said opening can easily drain away from the front of such opening. In the example there is for the purpose mentioned a ring 14, of india-rubber, between the adjacent front peripheral portions of the holder 2 and transmitter-case, the inner periphery of the said ring being slightly less in diameter than that of the said opening $2^b$. The cover $8^a$ is made removable, and a water-tight joint is made between it and the front end of the casing 8 by a packing-ring 15. The side of the casing is formed with a branch opening 16 for the passage of the insulated conductors hereinafter referred to, and this opening is fitted with a gland or bush 17, that can be secured in a water-tight manner in the said opening and can be sweated to the lead covering of the said conductors, so as to avoid any liability of moisture entering the casing at this point. The rear wall 8ᵇ of the casing 8 has cast in it a vertical passage 18, Fig. 3, that terminates at its upper end in a hole 19, communicating with the interior of the casing, and at its lower end in a flanged part 20, to which is fixed the rear end 21 of a hearing-tube 22, that extends to the front of the apparatus and terminates, preferably, in a trumpet-shaped mouth 23. The passage 18 and tube 22 together form a doubly-bent sound-passage by which the telephonically-produced sounds can be heard in a louder and better manner than is the case in instruments in which a sound-passage having a single bend is used. Over the hole 19 in the rear wall of the casing 8 is fixed in a vertical position a telephonic receiver of the kind described in the specification of my said former patent, No. 655,620, and comprising a diaphragm 25, held in a vertically-arranged circular frame 26, and a permanent magnet 27, of partly-circular shape, having inwardly-bent ends 27ᵃ, each of which carries a polar extension 27ᵇ, that extends at right angles to the plane of the magnet and toward the receiver-diaphragm 25 and is provided with a coil of wire 28. The two coils 28 are connected in series and to two terminals 29 and 30, Fig. 2, that are respectively fixed on two blocks 31 and 32, of insulating material. To the block 31 are fixed two other contacts 34 and 35, which respectively carry spring-blades 36 and 37, arranged to respectively bear against the two concentric metal terminals 4 and 3 of the rotary transmitter 1. Fixed upon the block 32 are a number of other insulated contacts—viz., 39, 39*, 30, 41, 42, and 43—and also two bearings 44 and 45, in which is mounted to turn a spindle 46, carrying a cylinder 47, of insulating material, (hereinafter called for distinction the "switch-cylinder,") which carries two separate contact-pins 48 and 49 and a longitudinally-arranged contact-strip 50. The contact-pin 48 is normally held by the switch-cylinder 47 under the action of a spring 51 between two spring-contacts 52 and 53, that are respectively connected to terminals 39* and 40. The other contact-pin 49 is normally out of use, but is so arranged, as shown, that by partly turning the switch-cylinder 47 in the direction of the arrow x, Fig. 2, it will be caused to bear between two other spring-contacts 54 and 55, that are connected, respectively, to the terminals 30 and 39*, the contact-pin 48 then passing out of connection with its pair of spring-contacts 52 and 53. The terminals 41 and 42, respectively, carry spring-blades 56 and 57, that rest against the switch-cylinder 47 and are adapted to simultaneously bear upon the contact-strip 50 thereon when the said cylinder is turned sufficiently against the action of its spring 51 to cause the pin 49 to bear against the contact-springs 54 and 55. Terminal 43 is connected to terminal 34 by a conductor 58 and carries a spring-blade 59, that can be pressed into contact with an extension 41* of terminal 41 by a bell-push 60. This bell-push extends through the cover 8ᵃ of the casing 8 in a water-tight manner—as, for example, through a closely-fitting bearing 61ᵃ, Fig. 5—and a cylinder 61ᵇ, provided with a spring 61ᶜ, that bears at one end against the cylinder and at the other end against a collar 61ᵈ on the push and serves normally to hold the latter in its outer and inoperative position. 61ᶠ is a washer of india-rubber to insure a water-tight joint between the push 60 and cover 8ᵃ. The inner end of the push 60 is tipped with insulating material 61ᵉ to prevent short-circuiting of the spring-blade 59 when the push 60 is forced inward against the same. Terminals 39 and 39* are electrically connected together by a conductor 39ᵇ, and terminals 35 and 42 are connected together by a conductor 35*.

When the apparatus is to be used, terminal 29 is connected to one pole of a battery 62 and to a return-conductor E by a conductor 63, Figs. 2 and 6. Terminal 43 is connected to the other pole of the battery 62 by a conductor 64. Terminals 39 and 41 are respectively connected to two separate insulated line-wires 65 and 66, that extend to another similar apparatus at a distance, and terminal 40 is connected by a conductor 67* to one terminal of a bell 68, the other terminal of which is connected by a conductor 67 to the return-conductor E. The five conductors 63, 64, 65, 66, and 67 for effecting the above connections are insulated from each other and formed into two lead-covered cables 69, Fig. 2, that extend through the lateral branch 16 of the casing 8 and are sweated to the bush or gland 17, which is secured in a water-tight manner in the said branch. The spindle 46, carrying the switch-cylinder 47, extends through a stuffing-box 70 in the wall of the casing 8 and is provided at its outer end with a hand-lever 71. Encircling the said spindle is the spring 51, one end of which is fixed to the spindle and the other end of which is fixed to the adjacent bearing 45.

The working of two connected instruments, each constructed as described and located at two separate stations $a$ and $b$, is as follows, reference being had to Figs. 6 and 7: The line-wires 65 and 66, connected, respectively, to the terminals 39 and 41 of the instrument at station $a$, are connected, respectively, to the terminals 41 and 39 of the other instrument at station $b$. Normally both switch-cylinders 47 are in the position shown in Fig. 6, so that the transmitter 1 and receiver-coils 28 of each instrument are out of circuit, the transmitter-circuit being open between the spring-blades 56 and 57 and the circuit of the receiver-coils 28 being open between the spring-contacts 54 and 55. Each bell 68 is, however, adapted to be brought into circuit and caused to ring by forcing inward the bell-push 60 of the other instrument. Assuming the bell-push 60 of the instrument at station $b$ to be forced inward, then the circuit of bell 68 at station $a$ will be from one pole of the battery 62 at station $b$ through the parts 64, 43, 59, and 41* 41 of the instrument at station $b$, the line-wire 65, and the parts 39, 39$^b$, 39*, 52, 48, 53, 40, and 67 of the instrument at station $a$ to the bell 68 at that station, and thence by conductor 67* to the return-conductor E, through which the circuit is completed to the other pole of the battery 62 at station $b$. The bell 68 at station $b$ can be rung to acknowledge the receipt of the call-signal at station $a$ or to ring up station $b$ by pressing in the bell-push 60 at station $a$, current then passing from the battery 62 at that station through the parts 64, 43, 59, and 41* 41 at station $a$ through line-wire 66 to terminal 39 of the instrument at station $b$, the circuit being completed through the parts 39$^b$, 39*, 52, 48, 53, 40, and 67 to bell 68, and thence by conductor 67* to the return-conductor E and back to the battery 62 at station $a$. One station having called up the other, each bell-circuit can be opened and telephonic conversation can be carried on between the two stations by partly rotating the switch-cylinder 47 in each instrument in the direction of the arrow $x$, Fig. 7, against the action of its spring 51 by partly turning the hand-lever 71. Each bell-circuit will then be opened between the spring-contacts 52 and 53, each transmitter-circuit will be closed between the spring-contacts 56 and 57 by the contact 50, and the circuit of the receiver-coils 28 will be closed between the spring-contacts 54 and 55 by pin 49. Fig. 7 shows the new position of the various parts. The telephonic circuit of the transmitter of the instrument at station $a$ and the receiver of the instrument at station $b$ will then be completed from battery 62 at station $a$ through the parts 64 43 58 34 36, transmitter 1, and parts 37, 35, 35*, 42, 57, 50, 56, and 41 of instrument at $a$, line-wire 66, and parts 39 39$^b$ 39* 55 49 54 30, receiver-coils 28, and parts 29 and 63 of instrument at $b$ to the return-conductor E, and thence back to the battery 62 at station $a$. The telephonic circuit of the transmitter of the instrument at station $b$ and the receiver of the instrument at station $a$ will at the same time be completed from the battery 62 at station $b$ through the parts 64 43 58 34 36, transmitter 1, and parts 37, 35, 35*, 42, 57, 50, 56, and 41 of instrument at station $b$, line-wire 65, and parts 39 39$^b$ 39* 55 49 54 30, receiver-coils 28, and parts 29 and 63 of instrument at station $a$ to the return-conductor E, and thence back to the battery 62 at station $b$. Upon releasing the hand-lever 71 of each instrument the corresponding switch-cylinder 47, with contacts 48, 49, and 50, will be automatically returned to their normal positions (shown in Fig. 6) by the action of the spring 51.

By the construction described it will be seen that the rotary holder 2, with waterproof transmitter, can be readily rotated from time to time to shake up the carbon particles of the transmitter, that the switch-operating device 47 can be operated independently of the transmitter, and that the interior of the casing 8 is rendered practically waterproof at all points, so that the apparatus will remain in an efficient condition even in exposed positions.

As will be obvious, telephonic apparatus of the kind hereinbefore described, wherein the transmitter is mounted to rotate in a watertight manner on the front cover of the watertight casing 8, and the switch-operating device is disconnected from the transmitter and the receiver arranged vertically at the back of the casing over the inner end of a bent passage that is formed in the rear wall of the casing and communicates with one or more tubes through which the sounds produced by the telephonic receiver can be heard, can be variously modified, also that the switch-operating device can be operated from the exterior of the casing in various ways independently of the transmitter otherwise than as hereinbefore described—as, for example, from a rotary tube that is arranged to come into communication with the sound-passage 18 and is connected to one or more hearing-tubes. Figs. 8 to 11 show an arrangement of the latter kind wherein the movable contacts 48$^a$, 49$^a$, and 50$^a$ of the switch, corresponding to the parts 48, 49, and 50, respectively, of the switch in Figs. 1 to 7, inclusive, are carried by an insulating switch cylinder or sleeve made in two parts 72 73, that are fixed upon a rotary tube 74, that extends across the casing 8 and the ends of which are in communication with two bent downwardly-extending tubes 76, the lower ends of which are bent toward each other and enlarged, as shown at 77, and provided with rubber rings 78 to form earpieces that can be caused to fit closely against the ears of the person using the apparatus. The rotary tube 74 is at a part thereof within the casing 8 formed with a slot 80, adapted to be brought opposite the opening 19 of the upper end of the vertical passage 18, so that the vibrations from the receiver-diaphragm 25 can enter the rotary tube and pass by the tubes 76 to the earpieces 77. The central portion of the tube 74, in which the slot 80 is formed, is covered by a cap-piece 81 or is otherwise adapted to prevent communication between the said passage 18 and the interior of the casing 8. One of the tubes 76—for instance, the right-hand one—may be of rigid material and the other of flexible materal, as shown, so that when a person applies one ear to the right-hand earpiece the left-hand earpiece can be readily applied to his other ear. In this modified arrangement the electrical contacts and connections are substantially similar to those in the arrangement shown in Figs. 1 to 7, inclusive, and are similarly marked, but with an index-letter *a* attached. The pin 48ª normally bears against and between two spring-contacts 52ª and 53ª, fixed, respectively, to the terminals 39ª and 40ª for closing the bell-circuit at this point, while the contacts 49ª and 50ª are in their inoperative positions in which the transmitter and receiver are out of circuit. When, however, the rotary tube 74 is moved in the direction of the arrow *y*, Fig. 9, the pin 48ª is moved into its inoperative position and pin 49ª is caused to bear against and between the spring-contacts 52ª and 54ª, connected, respectively, to terminals 39ª and 30ª, so as to then close the receiver-circuit, and pin 50ª is caused to bear against and between the spring-contacts 56ª and 57ª, connected, respectively, to terminals 41ª and 42ª, so as to then close the transmitter-circuit. 59ª is the spring-contact connected to terminal 43ª and adapted to be forced by the bell-push 60ª into contact with the terminal 41*ª. In this arrangement, for convenience of coupling-up, terminal 41ª is connected to terminal 34ª by a conductor 82, terminal 41*ª is disconnected from terminal 41ª and connected by a conductor 83 to terminal 35ª, which is connected direct to the line-wire 66ª, and terminal 42ª is connected by a conductor 84 to terminal 43ª, which is connected, as before, to the battery-wire 64ª. Terminal 29ª is connected to one pole of the battery 62ª, terminal 39ª to line-wire 65ª, and terminal 40ª to the bell-wire 67*ª, as before. In this case the circuit of the bell 68ª, belonging to the instrument, Fig. 9, is normally completed, as before, through the parts 65ª 39ª 52ª 48ª 53ª 40ª 67ª, bell 68ª, and parts 67*ª to return-conductor Eª. The circuit of the transmitter of the instrument when the switch is operated to complete such circuit is from one pole of the battery 62ª through parts 64ª 43ª 84 42ª 57ª 50ª 56ª 41ª 82 34ª 36ª, transmitter 37ª 35ª to line-wire 66ª, and the circuit of the receiver of the said instrument is at the same time from line-wire 65ª through the parts 39ª 52ª 49ª 54ª 30ª, receiver-coils 28ª, and parts 29ª and 63ª to the return-conductor Eª. The circuit connections are thus substantially like those in the arrangement shown in Figs. 1 to 7, inclusive. When one hearing-tube 76 is of rigid material and the other of flexible tubing, as in the example shown, the upper end of the latter tube may be connected to a tubular junction-piece 90, that is fixed to the casing 8 at 91, as shown in Fig. 11, and is provided with a tubular extension 92, between which and the junction-piece is an annular recess 93. The other or rigid tube 76 is fixed to one end of the rotary tube 74, which extends through a bearing 94 in the casing 8, and the other end of which fits over the fixed tubular extension 92 and into the recess 93. With this arrangement sound-waves entering the rotary tube 74 from the passage 18 are prevented from escaping except through the two tubes 76. The rigid tube 76 may be normally held in the position to complete the bell-circuit and cut out the transmitter and receiver by a spring catch or holder that can be of any suitable construction capable of readily permitting the tube to be moved forward into position to be applied to one of the user's ears and simultaneously put the bell out of circuit and the transmitter and receiver in circuit. In the example shown in Figs. 8 and 9 the catch or holder comprises a pin 95, provided with a knob 96, and fixed to a second pin 97, secured to the casing 8.

What I claim is—

1. Telephonic apparatus comprising a water-tight casing having at its rear end an upwardly-extending sound-delivery passage one end of which communicates with the interior of the casing through a hole in the rear wall thereof, a receiver arranged vertically within and at the rear portion of said casing and having its diaphragm secured over said hole, a transmitter rotatably secured to the front of the casing, a hearing-tube having one end in connection with the second end of the sound-delivery tube, and means located within said casing and capable of being operated from the exterior thereof for controlling the circuits of said receiver and transmitter.

2. Telephonic apparatus comprising a casing provided with a sound-passage arranged to communicate with the interior of said casing through a hole in the rear wall thereof, a hearing-tube in connection with said passage, a holder with waterproof telephonic transmitter secured in a rotary and water-tight manner to the front of said casing, a telephonic receiver having its diaphragm secured over the hole in the rear wall of said casing, transmitter, receiver and bell terminals located within said casing, a switch located within said casing but disconnected from said transmitter and holder and adapted to control the circuits of said transmitter, receiver and a bell, as set forth, and means extending through said casing in a water-tight manner and whereby said switch can be operated from the exterior of said casing independently of said transmitter for controlling said circuits.

3. Telephonic apparatus comprising a casing having a passage formed in its rear wall and terminating at one end in a hole extending through said rear wall, a waterproof microphone-transmitter secured in a rotary and water-tight manner to the front end of said casing, a magneto-electric receiver arranged vertically at the rear end of and within said casing with its diaphragm over said hole, a tube extending across said casing and arranged to be placed in communication with said passage, a hearing-tube in communication with the first-mentioned tube, and a switch located within said casing and adapted to be operated independently of said transmitter from the exterior of said casing for controlling the circuits of said transmitter and receiver.

4. Telephonic apparatus comprising a casing having a passage formed in its rear wall and terminating at one end in a hole extending through said rear wall, a waterproof microphone-transmitter secured in a rotary and water-tight manner to the front end of said casing, a magneto-electric receiver arranged vertically at the rear end of and within said casing with its diaphragm over said hole, a rotary tube extending across said casing and formed with a hole adapted to be brought opposite the other end of said passage, a hearing-tube fixed to said rotary tube and provided with an earpiece, and a switch located within said casing and adapted to control the circuits of said transmitter and receiver, said switch being arranged to be operated from the exterior of said casing independently of transmitter.

5. Telephonic apparatus comprising a casing having a sound-delivery passage communicating with its interior through its rear wall, a waterproof microphone-transmitter secured in a rotary and waterproof manner to the front end of said casing, a telephonic receiver arranged within and at the rear portion of said casing with its diaphragm over said hole, a rotary tube arranged to extend across said casing and having its interior in communication with said passage, an external hearing-tube secured to said rotary tube, and a switch located within said casing for controlling the circuits of said transmitter and receiver and arranged to be operated by movement of said external hearing-tube.

6. Telephonic apparatus comprising a casing having a sound-delivery passage communicating with its interior through its rear wall, a waterproof microphone-transmitter secured in a rotary and waterproof manner to the front end of said casing, a telephonic receiver arranged within said casing with its diaphragm over said hole, a rotary tube arranged to extend across said casing and having its interior in communication with said passage, an external hearing-tube secured to said rotary tube, and a switch located within said casing for controlling the circuits of said transmitter and receiver and arranged to be operated from said rotary tube.

7. Telephonic apparatus comprising a casing having a sound-delivery passage communicating with its interior through its rear wall, a waterproof microphone-transmitter secured in a rotary and waterproof manner to the front end of said casing, a telephonic receiver arranged within said casing with its diaphragm over said hole, a tube arranged across and mounted to rotate in said casing and formed with an opening arranged to be placed in communication with said passage, an external hearing-tube of rigid material fixed to one end of said rotary tube, an external hearing-tube of flexible material in communication with the other end of said rotary tube, and a switch located within said casing and capable of controlling the circuits of said transmitter and receiver, said switch being arranged to be operated by movement of said rigid hearing-tube.

8. Telephonic apparatus comprising a casing having a sound-delivery passage communicating with its interior through its rear wall, a waterproof microphone-transmitter secured in a rotary and waterproof manner to the front end of said casing, a telephonic receiver arranged within said casing with its diaphragm over said hole, a rotary tube mounted in said casing and formed with an opening arranged to be placed in communication with said passage, external hearing-tubes one of which is of rigid material and is secured to one end of said tube and the other of which is provided with a tubular junction-piece secured to the opposite side of said casing and opposite the other end of said rotary tube, and movable and fixed switch-contacts for controlling the circuits of said transmitter and receiver and of a bell, said movable contacts being carried by said rotary tube.

9. Telephonic apparatus comprising a casing provided with a sound-delivery passage, a waterproof microphone-transmitter, a holder carrying said transmitter and mounted to rotate in the front cover of said casing, adjacent parts of said holder and cover having oppositely-arranged annular grooves of curved section, a lubricated packing-ring of circular section arranged between said holder and cover and within the juxtaposed grooves so as to form a water-tight joint between them, an annular plate secured to the inner end of said holder and arranged to rotate in contact with the inner side of said cover and retain said holder in place, a receiver arranged within said casing with its diaphragm over one end of said passage, and a switch device located within said casing and adapted to control the circuit of said transmitter and receiver.

10. Telephonic apparatus comprising a casing formed at its rear side with a vertical passage open at both ends one of which communicates with the interior of said casing through its rear wall, said casing also having an opening in its side for passage of conductors, a holder mounted to rotate on the front of said casing, a microphone-transmitter fixed in said holder and carrying concentrically-arranged terminals located within said casing, a magneto-electric receiver having its diaphragm arranged over the hole in the rear wall of said casing, a rotary tube mounted in said casing and formed with an opening adapted to be brought opposite the second open end of said passage, a movable hearing-tube of rigid material fixed to one end of said rotary tube at one side of said casing, a second movable hearing-tube arranged at the opposite side of said casing and in communication with said rotary tube through its other end, insulated terminals $29^a$, $30^a$, $34^a$, $35^a$, $39^a$, $40^a$, $41^a$, $41^{*a}$, $42^a$ and $43^a$, spring-contacts $36^a$ and $37^a$ connected to said terminals $34^a$ and $35^a$ and arranged to respectively bear against the concentrically-arranged transmitter-terminals, spring-contacts $52^a$, $53^a$, and $54^a$ connected respectively to said terminals $39^a$, $40^a$ and $30^a$, spring-contacts $56^a$ and $57^a$ connected respectively to said terminals $41^a$ and $42^a$, a spring-blade $59^a$ connected to said terminal $43^a$, a bell-push adapted to press said spring-blade $59^a$ into contact with said terminal $41^{*a}$, insulated contacts $48^a$, $49^a$ and $50^a$ carried by said rotary tube, said contact $48^a$ being arranged to connect said spring-blades $52^a$ and $53^a$ when said rigid hearing-tube is moved into its backward or inoperative position and to move out of contact with said spring-blades $52^a$ and $53^a$ when said rigid tube is moved into its forward or operative position, and said contacts $49^a$ and $50^a$ being arranged to respectively connect the pairs of spring-blades $52^a$, $54^a$, and $56^a$ $57^a$ when said rigid tube is moved into the operative position and to disconnect said pairs of blades $52^a$ $54^a$ and $56^a$ $57^a$ from each other when said rigid tube is moved into its inoperative position, said terminal $29^a$ being connected to terminal $30^a$ through said magneto-electric receiver and adapted to be connected to one pole of an electric generator, said terminals $35^a$ and $39^a$ being adapted to be connected to separate line-wires, terminal $34^a$ being connected to terminal $41^a$, terminal $41^{*a}$ being connected to terminal $35^a$, terminals $42^a$ and $43^a$ being connected together and adapted to be connected to the opposite pole of said electric generator, and said terminal $40$ being adapted to be connected to a bell, all substantially as described for the purposes set forth.

Signed at 75, 76, and 77 Cornhill, London, E. C., this 21st day of January, 1903.

ALFRED GRAHAM.

Witnesses:
HENRY MAYKELS,
WM. O. BROWN.